Figure 6:
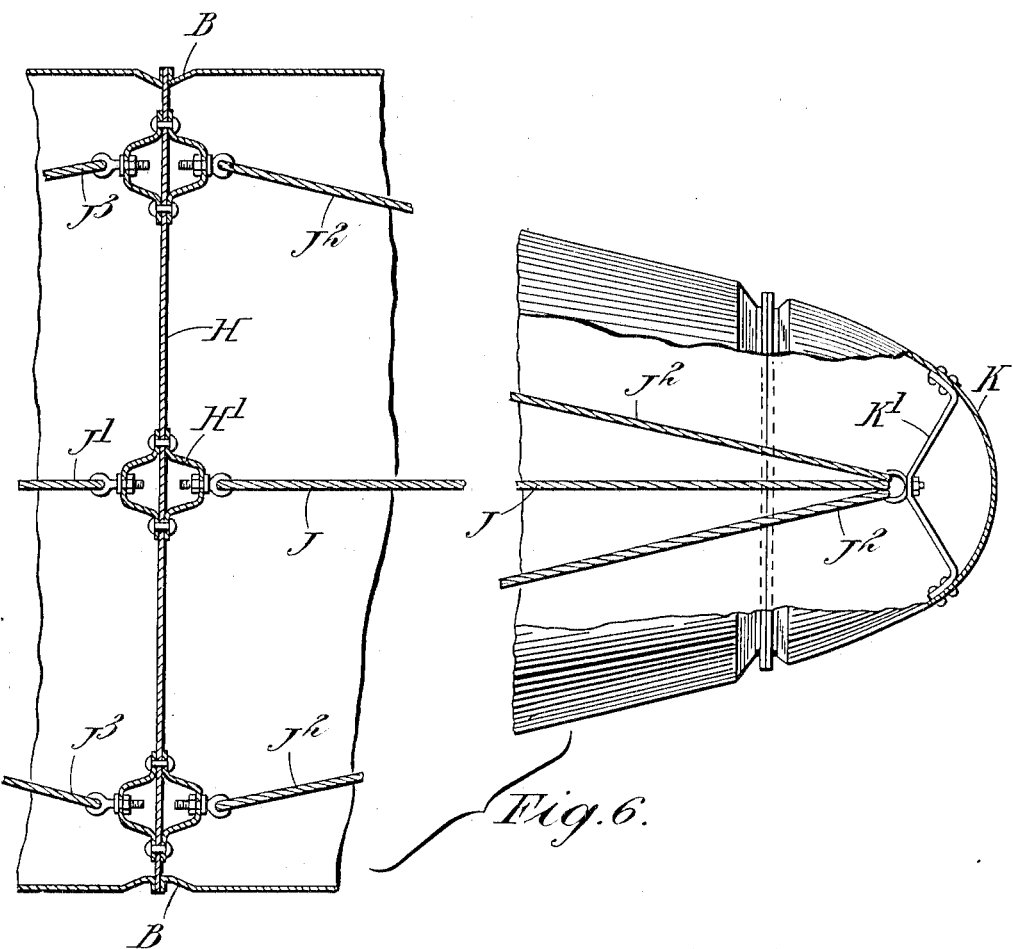

T. SLOPER.
FLEXIBLE CHAMBER FOR CONTAINING AIR OR OTHER FLUIDS AND MEANS FOR MAKING JOINTS IN AND ATTACHMENTS TO THE SAME.
APPLICATION FILED JULY 14, 1914.
1,118,451.
Patented Nov. 24, 1914.
5 SHEETS—SHEET 1.
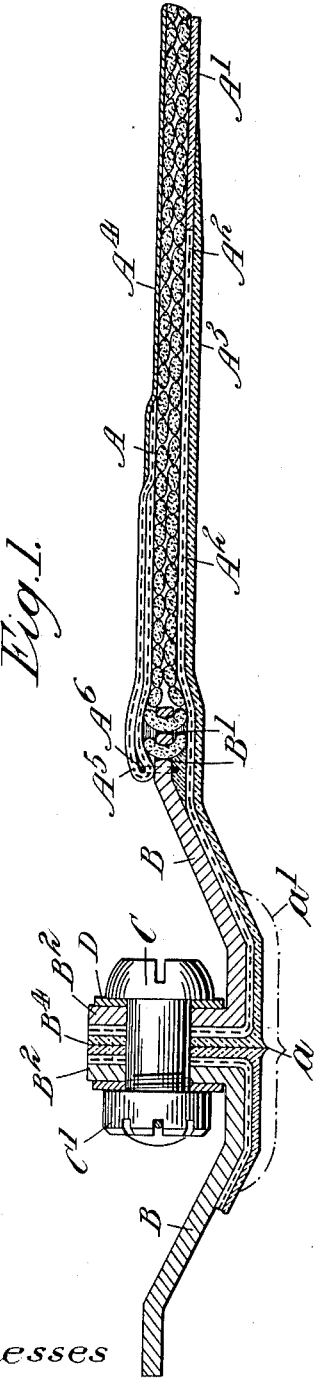
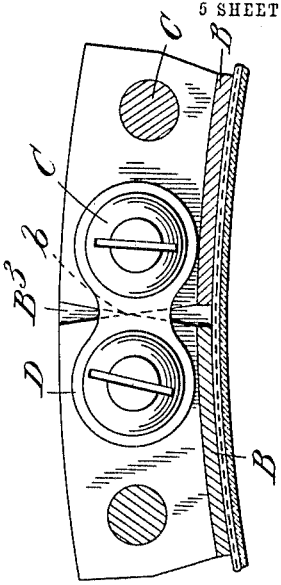
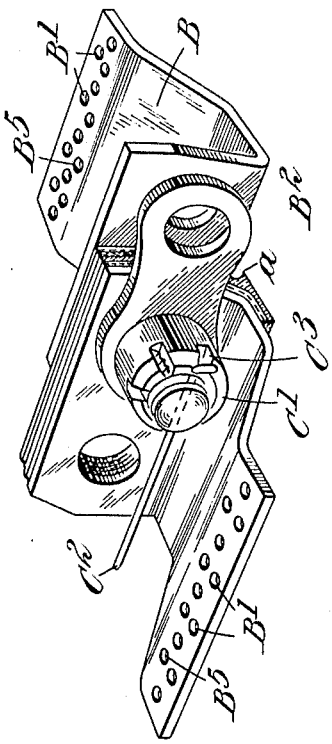
Witnesses
R. H. Balderson
H. M. Corkin
Inventor
Thomas Sloper
by Bakewell, Byrnes Parmelee
Attys

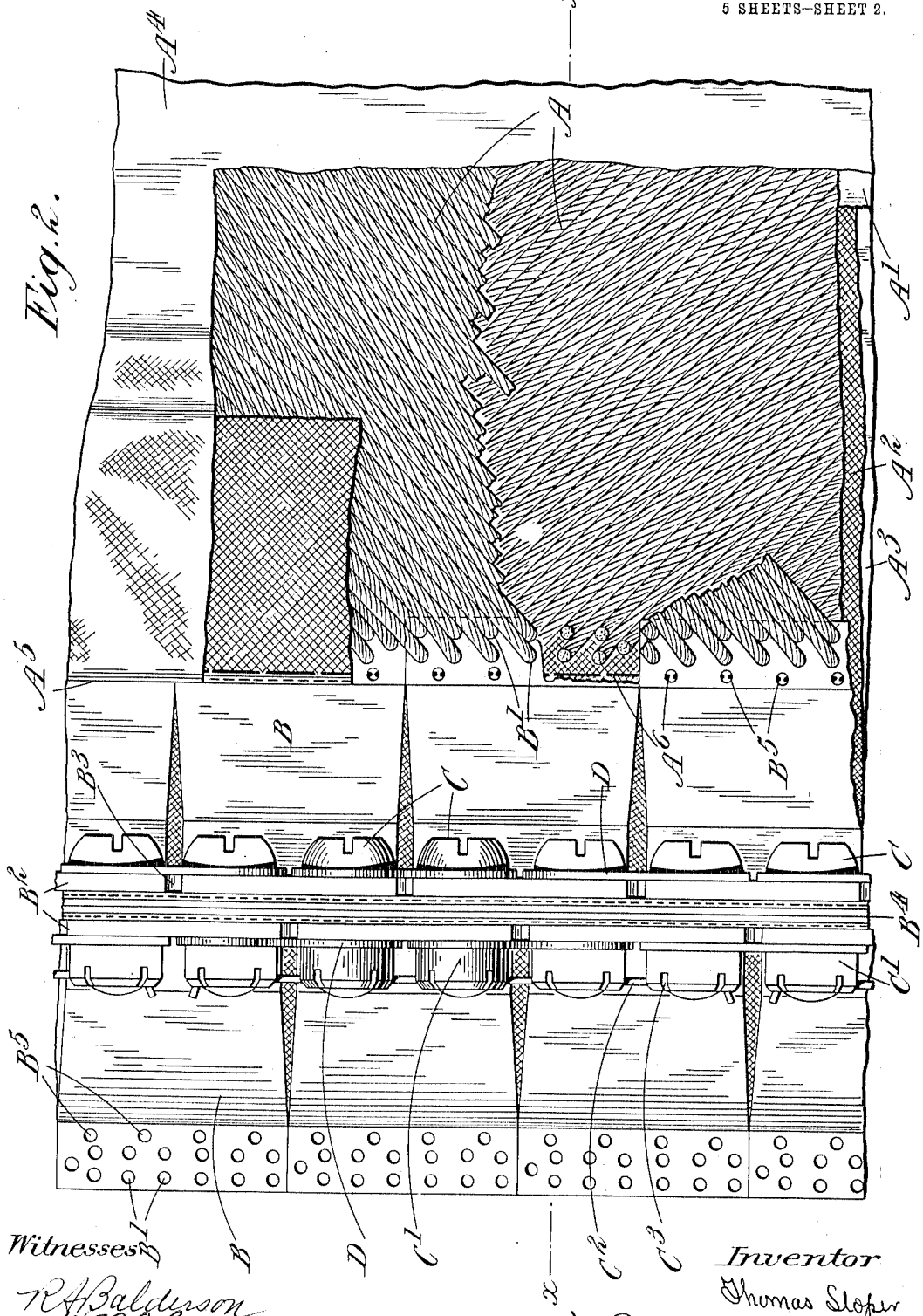

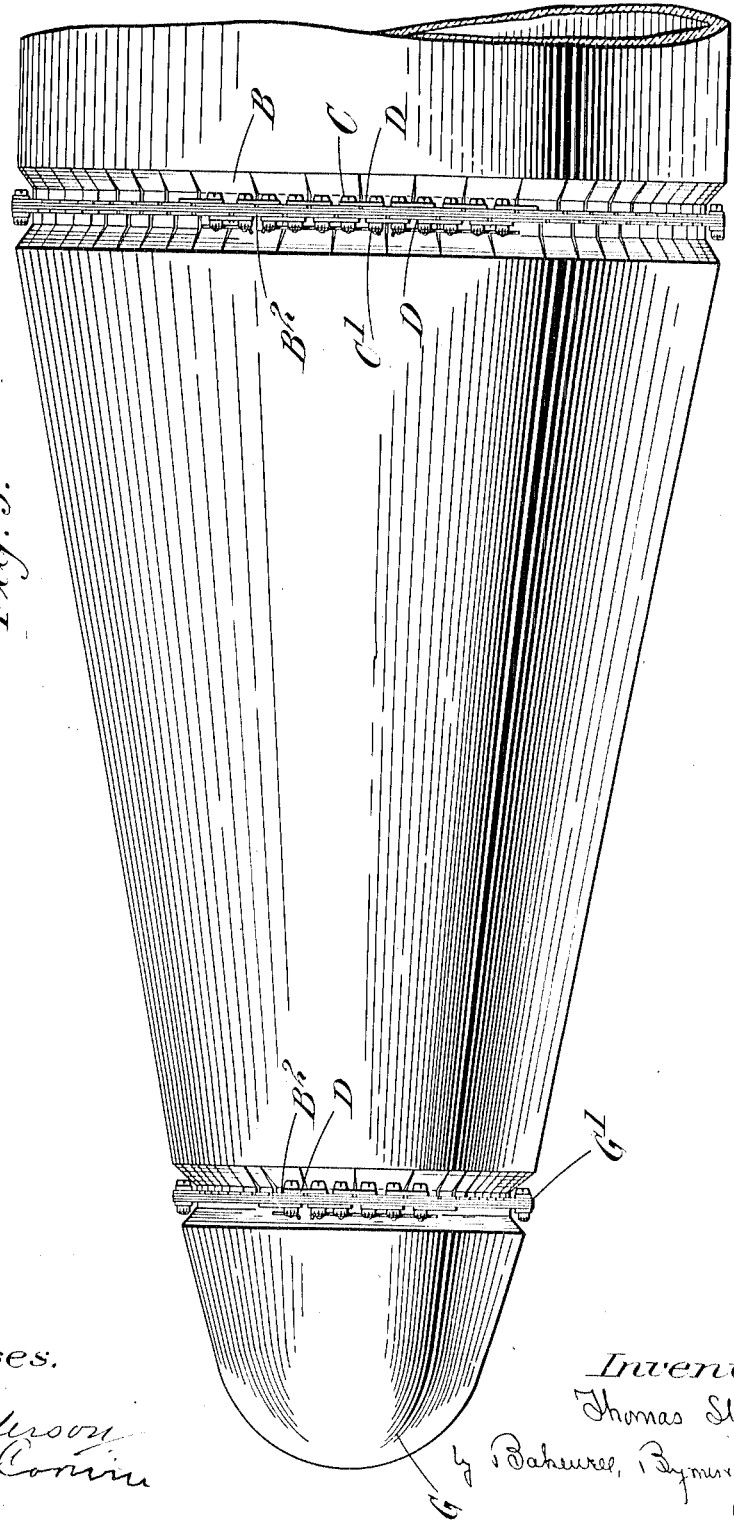

T. SLOPER.
FLEXIBLE CHAMBER FOR CONTAINING AIR OR OTHER FLUIDS AND MEANS FOR MAKING JOINTS IN AND ATTACHMENTS TO THE SAME.
APPLICATION FILED JULY 14, 1914.

1,118,451.

Patented Nov. 24, 1914.

T. SLOPER.
FLEXIBLE CHAMBER FOR CONTAINING AIR OR OTHER FLUIDS AND MEANS FOR MAKING JOINTS IN AND ATTACHMENTS TO THE SAME.
APPLICATION FILED JULY 14, 1914.

1,118,451.

Patented Nov. 24, 1914.
5 SHEETS—SHEET 5.

UNITED STATES PATENT OFFICE.

THOMAS SLOPER, OF DEVIZES, ENGLAND.

FLEXIBLE CHAMBER FOR CONTAINING AIR OR OTHER FLUIDS AND MEANS FOR MAKING JOINTS IN AND ATTACHMENTS TO THE SAME.

1,118,451.  Specification of Letters Patent.  Patented Nov. 24, 1914.

Application filed July 14, 1914. Serial No. 851,016.

*To all whom it may concern:*

Be it known that I, THOMAS SLOPER, a subject of the King of England, residing at Devizes, Wiltshire, England, have invented certain new and useful improvements in flexible chambers for containing air or other fluids and means for making joints in and attachments to the same, of which the following is a specification.

This invention is for improvements in or relating to flexible chambers for containing air or other fluids and to means for making joints in and attachments to the same, and has particular reference to the construction of floats for hydro-aeroplanes. As is well-known, it is impossible to tell at what angle a float will strike the water when a hydro-aeroplane is settling thereon and as the forces exerted upon the float are considerable, the floats are easily damaged or even completely destroyed, whereas if they could be made flexible and yet in such manner as to withstand the necessary pressures, a longer life for them would be obtainable.

Rubbered fabrics, such as have already been employed for tires, are well known as having great strength and flexibility, but it is a very difficult matter to make a float in one piece and vulcanize it up as a closed vessel, and also very difficult to repair the same if damaged. In the carrying out of this invention it is proposed to use such rubbered fabrics for the walls of the chamber, and the term "flexible material" employed in this specification and claims is intended to cover any rubber or rubbered fabric suitable for the purpose.

According to this invention a chamber for fluids is built of sections of flexible material connected edge to edge by forcing one against the other between non-flexible plates located side by side along each edge and having only hinging connections with each other (say by means of connecting bolts and the flexible material itself) about axes transverse to the joint and approximately parallel to or in the general plane of the material and being either spaced apart or so shaped (for example by having rocking edges at the ends of the plates) that the coupled edge can flex about the aforesaid transverse axes. If desired, the edges of the flexible material are set upright to the general plane of the material and are in this position clamped face to face between the aforesaid plates. There may be further combined with the plates, links for hinging them together to increase the restraining power of the joint without preventing the flexing movements.

Figure 7:
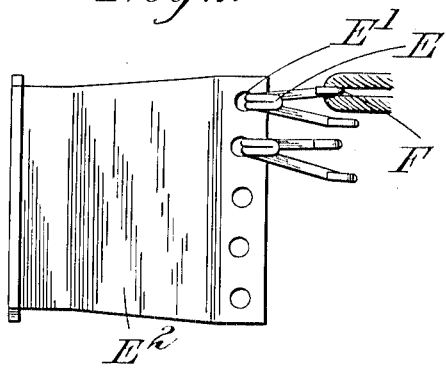
Figure 8:
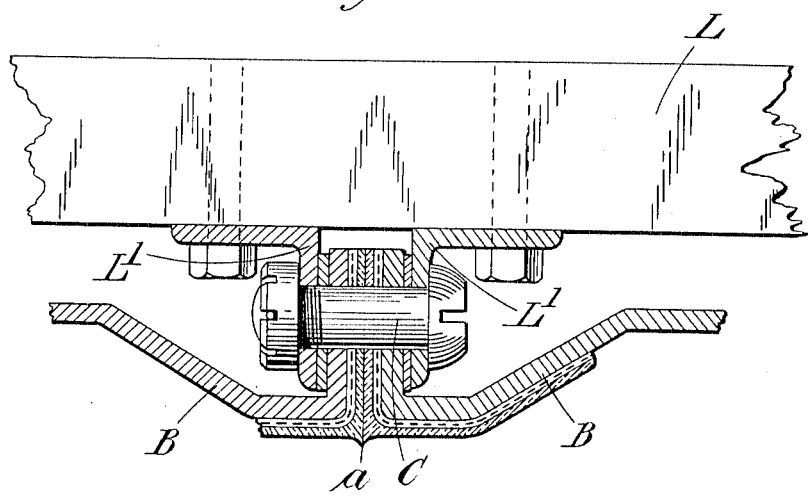

In the accompanying drawings:—Figure 1 is a section through a joint and part of the fabric of a chamber formed of flexible material according to one method of carrying out this invention; Fig. 2 is a plan of the parts shown in Fig. 1, with portions removed to show different layers of the material; Fig. 3 is a perspective view of a part of the joint shown on a larger scale than that of Figs. 1 and 2; Fig. 4 is a side elevation of part of a flexible joint according to the present invention; Fig. 5 is an elevation of the end portion of a chamber constructed according to the present invention; Fig. 6 is a section through the end portion of a chamber constructed according to the present invention; Fig. 7 shows in plan a modification of a detail, and Fig. 8 is a section through part of a joint such as is shown in Fig. 1 with a fixture attached thereto.

Like letters indicate like parts throughout the drawings.

The restraining fabric composing the main body of the flexible walls of the chamber is built up of rubbered cords A such as are used in the manufacture of the well-known Palmer cord tires for motor vehicles. These cords may be placed together in two layers crossing each other and lying obliquely to the longitudinal axis $x$—$x$, Fig. 2, of the chamber, and are conveniently each threaded through orifices B' in the foot of a series of flanged plates B. Obviously all of the cords need not be threaded through orifices in the plates B, and if desired one layer may have the cords arranged longitudinally relatively to the gas-chamber and be threaded as described, while the other layer is disposed at right angles to them and parallel to the edge formed by the plates without being threaded through the orifices in the plates. The plates B are conveniently of metal so that they constitute non-flexible elements and are set side by side along the edge of the flexible fabric constituted by the cords A, the flange of each lying in line with its neighbor, so that together a flanged edge B² divided at intervals as at B³ is thereby provided for the fabric.

For making up a cylindrical float such as is indicated in Fig. 5, the fabric would be built up in the form of sleeves and end pieces, each edge being provided with a series of the flanged plates B so that the sections can be afterward secured together by the flanged ends thus afforded.

The flanges B² are perforated to receive clamping pins which in the example shown take the form of bolts C secured by nuts C', the said nuts being afterward locked by any convenient means, such as a wire C² threaded through the bolts and extending through notches C³ in the nuts.

To render the chamber air-tight throughout, it is conveniently lined with a layer of rubber A', and to effect the same purpose at the parts occupied by the plates B, a reinforcing piece of canvas A² may be secured to the inner face of the cord fabric A and extended over the plates B and up over the butting faces B⁴ of the flanged portion B² of the plates. This piece of canvas or other material A² can then be faced on the inside by a skin of rubber A³, which may be either a continuation of the lining A', or a separate piece attached to the latter. The outer surface of the flexible material constituted by the cords A, may also be covered by rubber A⁴ and this may overlap the foot ends of the plates B and be doubled back upon itself as at A⁵, canvas or other material being incorporated with it to strengthen the connection between the fabric A and the plates B. The doubled back end A⁵ may be stitched as at A⁶ through orifices B⁵ provided in the foot ends of the plates.

It will be appreciated that the layer of material A² with the skin of rubber A³ and the layer of rubber or rubbered canvas A⁴ or any such layers or extensions auxiliary to the cord layers A², all constitute parts of the flexible material constituting the walls of the chamber although they are distinct from that part of the walls which is constituted by the cords A. The restraining elements of the walls constituted by the cords in the example shown may be variously made up and the cords might be dispensed with, but whatever elements are used for this purpose they are preferably attached to the plates and the extensions or auxiliary layers must be continued in some form or other on the inside of the plates and over the butting faces which constitute the joint between any two sections of the chamber.

When the plates have all been built up with the fabric as described, the whole section is vulcanized together. It will be seen that the plates are all by this means separately secured to the fabric so that the edging formed by the plates and fabric can be flexed in a direction transverse to the edging, that is, along axes parallel to the line $x$—$x$ which is longitudinal to the chamber.

In securing the two sections together, the rubbered faces B⁴ of the flanged plates B are butted together, those of one section being made to break joint with those of the other, and by screwing up the nuts and bolts C, C', the edges of the fabric, that is, the lining-pieces A², A³, are clamped between the non-flexible plates B, so that an air-tight joint is made, and the fabric is provided with a lip $a$, Fig. 3, at the bend where it enters the joint so that when the edges are clamped between the non-flexible plates, the butting lips are forced outward as shown in Fig. 1 and insure a good seal at the extreme inner edge of the joint. If desired the joint may be covered by a strip of rubber or rubbered material indicated in chain line at $a'$ laid over the joint on the inside of the chamber and secured, say, by rubber solution. This joint, however, is not rigid but can flex about axes at right angles to its direction of length, and to strengthen the restraining power of the joint, connecting plates or links D are slipped over the bolts C, these links being used to hinge the different plates B on one section to each other, so that the flexibility of the joint is still not impaired, but its power to resist bursting pressure is increased.

It will be seen that the flange B² of each plate B is beveled off toward the foot and toward the outer edge of the flange from a point which is in line with the bolts C so that a projection $b$, Fig. 4, is provided at this point on each plate; the plates are thus kept clear of each other on either side of the projection $b$ so that sufficient space is thus provided between the plates to allow the requisite movement of the joint. It will also be noted that the plates B dip inward relatively to the general contour of the wall of the chamber so that the bolts C lie approximately in line with the plane of the fabric A which assists the free flexing of the joint with the fabric. Obviously other means may be employed for connecting the restraining fabric, that is, the cords A or whatever other flexible material is employed, to the plates B, and in Fig. 7, hooks E are shown as employed for this purpose. The hooks are double-ended and engage orifices E' in a plate E² corresponding to the plates B, and the other end of the hook receives the cords, as indicated at F.

In some cases it is desired to employ with an air-chamber having in general walls of flexible material, a section of non-flexible material, and in Fig. 5 the end portion of a cigar-shaped float is shown having a metallic cap C. In such cases the section of non-flexible material may be provided with a flange G' either integral with it or secured thereto, adapted to be secured to a corresponding flange built up of plates such as B or E² and secured to the flexible material constituting the adjacent section of the chamber. These rigid sections may be introduced at any part where rigidity is required and may be of any shape as will readily be understood.

The flexible joint constructed according to this invention permits a measure of distortion of the air-chamber without the joint receiving any permanent set, and moreover if any damage occurs, the parts of the air-chamber can be easily separated at the joint and repairs effected.

A further advantage of having the edging of non-flexible material divided so that flexibility in a direction transverse to the direction of its length is afforded, consists in facilitating the vulcanizing of the sections provided with these non-flexible elements, as a more simple mold can be employed to vulcanize a divided flange on to the flexible material than would be possible if the flange were undivided, as by reason of its being divided it can be sprung from the mold after vulcanization, whereas if it were a rigid flange, the mold would have to be made in several parts and taken to pieces to release the section.

If desired, a diaphragm H may be mounted between the butting faces of any one of the joints made by the plates B to divide the chamber into sections. In Fig. 6, the end portion of another cigar-shaped float is shown and the diaphragm H is mounted in what is intended to be approximately the middle joint of the chamber. The diaphragm may be of metal, or it may be of flexible material as found convenient.

It is in some cases desirable to tie the ends of these floats in, so that when striking the water they are prevented from being distorted unduly, and in Fig. 6 a tie J is shown for this purpose. One end of it is fixed to a strap K' on a metal end K, which latter tends to disperse any thrust upon the end over a considerable area of the chamber, and thus the tie operates to hold the whole of this end portion in. The end of the tie remote from the cap K may be connected direct to the opposite end of the float or to the diaphragm H, or it may be intermediately attached to the diaphragm H, as for example by being attached to a strap H' thereon. A second tie J' is shown as extending from the opposite side of the diaphragm and constituting practically a continuation of the tie J for fastening to the end of the float remote from the end K. Other ties J² may be provided which extend from the strap K' toward the sides of the float, being fixed to any convenient fastening such as the portions of the diaphragm H which lie near the joint in which the diaphragm is held. Obviously these ties J² may be connected to suitable fastenings provided on one or more of the plates constituting the joint if desired, but any such fastenings must be made gas-tight as will be understood. Other ties J³ corresponding to the ties J² may be carried from the edges of the diaphragm to that end of the float remote from the end K.

The plates B with their parts constituting the joint between two sections, may be utilized for attaching fixtures such as the frame-piece L to the float or other fluid-containing chamber. It will be appreciated that it is only necessary to provide suitable lugs, such as L', on the frame-piece, which lugs may engage the bolts C or their equivalent, for the purpose of effecting a firm connection between the frame and the joint of the chamber.

It will be seen that the plates B need not be secured to the fabric at all, but may merely be bolted like so many angle-pieces on opposite sides of flanges formed on the fabric, or again, they may be merely vulcanized on or into the fabric, for example, by extending the fabric over both sides, either burying the whole plate or part of it, perforations being provided to enable the rubber to form keys in the plates.

What I claim as my invention and desire to secure by Letters Patent is:—

1. A chamber for fluids comprising in combination, a plurality of chamber sections of flexible material, a plurality of non-flexible plates placed side by side along one side of each continuous edge of each flexible chamber section, and means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, substantially as set forth.

2. A chamber for fluids comprising in combination, a plurality of chamber sections of flexible material, a plurality of non-flexible plates placed side by side along one side of each continuous edge of each flexible chamber section, and clamping pins passing transversely through the plates and edges of two adjacent sections which pins forcibly draw the plates together so as to clamp the edges between the plates, the arrangement being such that the plates with the edges clamped between them can flex about axes transverse to the line of joining of the two sections and approximately parallel to or in the general plane of the flexible material, substantially as set forth.

3. A chamber for fluids comprising in combination, a plurality of chamber sections of flexible material the edges of which sections are set upright to the main plane of the material, a plurality of non-flexible plates placed side by side along the upright edge of each flexible chamber section and on that face of the edge which is toward the main body of the section, and means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, substantially as set forth.

4. A chamber for fluids comprising in combination, a plurality of chamber sections of flexible material, a plurality of non-flexible plates placed side by side along one side of each continuous edge of each flexible chamber section, and means for drawing the plates of adjacent sections forcibly together so as to clamp the edges of the two adjacent sections between them, the plates at each continuous edge of a section being connected end to end by means other than the flexible material and in such manner that they can hinge about axes transverse to the line of joining of the two sections and approximately parallel to or in the general plane of the flexible material, substantially as set forth.

5. A chamber for fluids comprising in combination, a plurality of chamber sections of flexible material the edges of which sections are set upright to the main plane of the material, a plurality of non-flexible plates placed side by side along the upright edge of each flexible chamber section and on that face of the edge which is toward the main body of the section, clamping pins passing transversely through the plates and edges of two adjacent sections which pins forcibly draw the plates together so as to clamp the edges between the plates, and links connecting the plates end to end as a chain by means of the pins therein the arrangement being such that the plates with the links and the edges clamped between the plates can flex about the axes of the pins, substantially as set forth.

6. A chamber for fluids comprising in combination, a plurality of chamber sections of flexible material the edges of which sections are set upright to the main plane of the material, a plurality of non-flexible plates flanged at one end to lie against the upright edge of each flexible section the foot of each plate lying against the main body of the section, and means for drawing the flanged ends of the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, substantially as set forth.

7. A chamber for fluids comprising in combination, a plurality of chamber sections of flexible material the edges of which sections are set upright to the main plane of the material, a plurality of non-flexible plates flanged at one end to lie against the upright edge of each flexible section the foot of each plate lying against the main body of the section and having a dip toward the interior of the chamber, at the flanged end, clamping pins passing transversely through the flanges of the plates and edges of two adjacent sections which pins forcibly draw the plates together so as to clamp the edges between the plates, these pins being situated approximately in line with the general plane of the material of the main body of the section, and the arrangement being such that the plates with the edges clamped between them can flex about the axes of the clamping pins, substantially as set forth.

8. A chamber for fluids comprising in combination, a plurality of chamber sections of flexible material, a plurality of non-flexible plates placed side by side along one side of each continuous edge of each flexible chamber section, means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, and means for anchoring the flexible material to the plates independently of the clamping between the plates, substantially as set forth.

9. A chamber for fluids comprising in combination, a plurality of chamber sections of flexible material, a plurality of non-flexible plates placed side by side along one side of each continuous edge of each flexible chamber section, means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, and means for operatively interlocking the material with the plates independently of the clamping between the plates, substantially as set forth.

10. A chamber for fluids comprising in combination, a plurality of chamber sections of flexible material containing cords, a plurality of non-flexible plates placed side by side along one side of each continuous edge of each flexible chamber section, and means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, and the cords in the flexible material being operatively interlocked with the plates whereby the material is secured to the plates independently of the clamping between them, substantially as set forth.

11. A chamber for fluids comprising in combination, a plurality of chamber sections of flexible material containing cords, a plurality of non-flexible plates operatively interlocked with the cords at the edge of each flexible section the flexible material having an extension from the cords over that side of the plates which is to bear against a correspondingly covered series of plates of an adjacent section, and means for clamping the plates of one section to those of another section so that the said extension of the material is clamped between the plates and affords a gas-tight lining between the plates on one section and between the two sets of plates on the two sections, substantially as set forth.

12. A chamber for fluids comprising in combination, a plurality of chamber sections of flexible material, a plurality of non-flexible plates placed side by side along one side of each continuous edge of each flexible chamber section, means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, a non-flexible section having a connecting portion which is shaped for clamping to the plates on a flexible section, and means for clamping the non-flexible and flexible section edges together, substantially as set forth.

13. A chamber for fluids comprising in combination, a plurality of tubular chamber sections of flexible material, a plurality of non-flexible plates placed side by side along one side of each continuous edge of each flexible chamber section, means for drawing the plates of adjacent sections forcibly together so as to clamp the edges of the two adjacent sections between them, the arrangement being such that the plates with the edges clamped between them can flex about axes transverse to the line of joining of the two sections and approximately parallel to or in the general plane of the flexible material, and a diaphragm closing one end of one of the tubular sections and having its edge shaped to lie between the edge of the section it closes and that of the next section to which the said edge is to be clamped so that the diaphragm is thus held in place, substantially as set forth.

14. A chamber for fluids comprising in combination, a plurality of chamber sections of flexible material, a plurality of non-flexible plates placed side by side along one side of each continuous edge of each flexible chamber section, clamping pins passing transversely through the plates and edges of two adjacent sections which pins forcibly draw the plates together so as to clamp the edges between the plates, the arrangement being such that the plates with the edges clamped between them can flex about axes transverse to the line of joining of the two sections and approximately parallel to or in the general plane of the flexible material, and a fixture having lugs which engage the clamping pins that clamp the plates of two adjacent sections together so that the clamping means serves to secure the fixture, substantially as set forth.

15. A chamber for fluids comprising in combination, a plurality of chamber sections of flexible material containing cords, a plurality of non-flexible plates carrying engaging portions about which the cords are threaded at the edges of the material so as to interlock the plates with the cords the flexible material having an extension from the cords over that side of the plates which is to bear against a correspondingly covered series of plates of an adjacent section, and means for clamping the plates of one section to those of another section so that the said extension of the material is clamped between the said plates and affords a gas-tight lining between the plates on one section and between the two sets of plates on the two sections, substantially as set forth.

16. A chamber for fluids comprising in combination, a plurality of chamber sections of flexible material containing cords, a plurality of non-flexible plates having in them a series of orifices through which the cords are threaded at the edges of the material so as to interlock the plates with the cords, the flexible material having an extension from the cords over that side of the plates which is to bear against a correspondingly covered series of plates of an adjacent section, and means for clamping the plates of one section to those of another section so that the said extension of the material is clamped between the said plates and affords a gas-tight lining between the plates on one section and between the two sets of plates on the two sections, substantially as set forth.

In testimony whereof I have signed my name to this specification in the presence of two subscribing witnesses.

THOMAS SLOPER.

Witnesses:
HAROLD PARSONS,
JAMES ARBEN.